United States Patent [19]
Batchelor et al.

[11] 4,413,607
[45] Nov. 8, 1983

[54] PROPANE CARBURETION SYSTEM

[76] Inventors: William H. Batchelor, 703 S. 11th, Lantana, Fla. 33460; Douglas R. Batchelor, 4020 Buffalo Rd., Buchanan, Mich. 49107

[21] Appl. No.: 247,598

[22] Filed: Mar. 25, 1981

Related U.S. Application Data

[63] Continuation-in-part of Ser. No. 177,790, Aug. 13, 1980, Pat. No. 4,369,751.

[51] Int. Cl.³ .................. F02B 43/00; F02M 29/00
[52] U.S. Cl. ................................ 123/590; 123/525; 123/489; 123/527; 48/180 C; 48/180 R; 261/DIG. 56
[58] Field of Search ............... 123/525, 526, 527, 489, 123/590; 48/180 R, 180 C; 261/DIG. 56

[56] References Cited

U.S. PATENT DOCUMENTS

| | | | |
|---|---|---|---|
| 2,675,793 | 4/1954 | Ziege | 123/525 |
| 2,752,758 | 7/1956 | Tann | 123/527 |
| 2,939,775 | 6/1960 | Middleton et al. | 48/180 R |
| 3,081,160 | 3/1963 | Ensign | 123/527 |
| 3,184,295 | 5/1965 | Baverstock | 123/525 |
| 4,063,905 | 12/1977 | Johnson et al. | 48/180 R |
| 4,119,068 | 10/1978 | Csonka et al. | 261/DIG. 56 |
| 4,150,562 | 4/1979 | Nielsen | 123/489 |

Primary Examiner—Charles J. Myhre
Assistant Examiner—E. Rollins Cross

[57] ABSTRACT

A system for an existing combustion engine is provided for enabling the engine to be operated on liquefied propane, alone, through a conventional gasoline carburetor, to operate on either gasoline or liquefied propane through a conventional gasoline carburetor, to operate on liquefied propane, alone, through an inlet casting to be utilized in lieu of a conventional gasoline carburetor, or to operate on liquefied propane, alone, at a substantially constant engine speed. Further, the system is also operative in conjunction with a diesel engine whereby a small amount of gasified liquid propane may be introduced into the induction system of a diesel engine as a supplemental fuel charge therefor during high power demand periods of operation. The system includes a regulator-vaporizer assembly for reducing the pressure of and thus transferring liquid propane into gasified liquid propane, heating the propane gas and ducting the propane gas to an induction passage mixer, the latter including various adjustment features whereby the proper mixture of induction air and propane is afforded.

22 Claims, 20 Drawing Figures

PROPANE CARBURETION SYSTEM

CROSS-REFERENCE TO RELATED APPLICATION

This application comprises a continuation-in-part of our copending U.S. application Ser. No. 177,790, for Liquefied Propane Carburetor Modification System, filed Aug. 13, 1980, now U.S. Pat. No. 4,369,751.

BACKGROUND OF THE INVENTION

The increasingly high cost of conventional gasoline fuels has produced a need for a means of using a more readily available and less expensive auxiliary fuel in conventional gasoline engines and to also supplement the power of diesel engines.

Furthermore, in view of the strong consciousness of air pollution as a result of the operation of conventional gasoline and diesel powered engines, a need exists for structure which will enable "cleaner" fuels, such as propane, to be burned in conventional gasoline or diesel fuel powered engines.

BRIEF DESCRIPTION OF THE INVENTION

The propane carburetion system of the instant invention has been specifically designed to enable the usage of propane as a major fuel in previously gasoline powered engines of the internal combustion type. The invention incorporates structure which will allow propane, alone, to be used as a fuel for the associated engine, propane and gasoline to be alternately used as fuel for a conventional gasoline powered engine and propane to be used as an additive fuel for a diesel liquid fuel powered engine.

The main object of this invention is to provide a propane carburetion system including basic regulator and vaporizer structure as well as induction air and propane mixing structure which may be readily incorporated into slightly modified carburetion systems and which may be adapted to a very large percentage of the existing liquid fuel powered internal combustion engines.

Another object of this invention is to provide a propane carburetion system which may be used to effectively provide an efficient air and fuel mixture for operation of various different internal combustion engines disposed in substantially different operating environments.

A final object of this invention to be specifically enumerated herein is to provide a propane carburetion system in accordance with the preceding objects and which will conform to conventional forms of manufacture, be of simple construction and easy to install, so as to provide a device that will be economically feasible, long lasting and relatively trouble-free in installation.

These together with other objects and advantages which will become subsequently apparent reside in the details of construction and operation as more fully hereinafter described and claimed, reference being had to the accompanying drawings forming a part hereof, wherein like numerals refer to like parts throughout.

DETAILED DESCRIPTION OF THE INVENTION

Figures 1, 2:
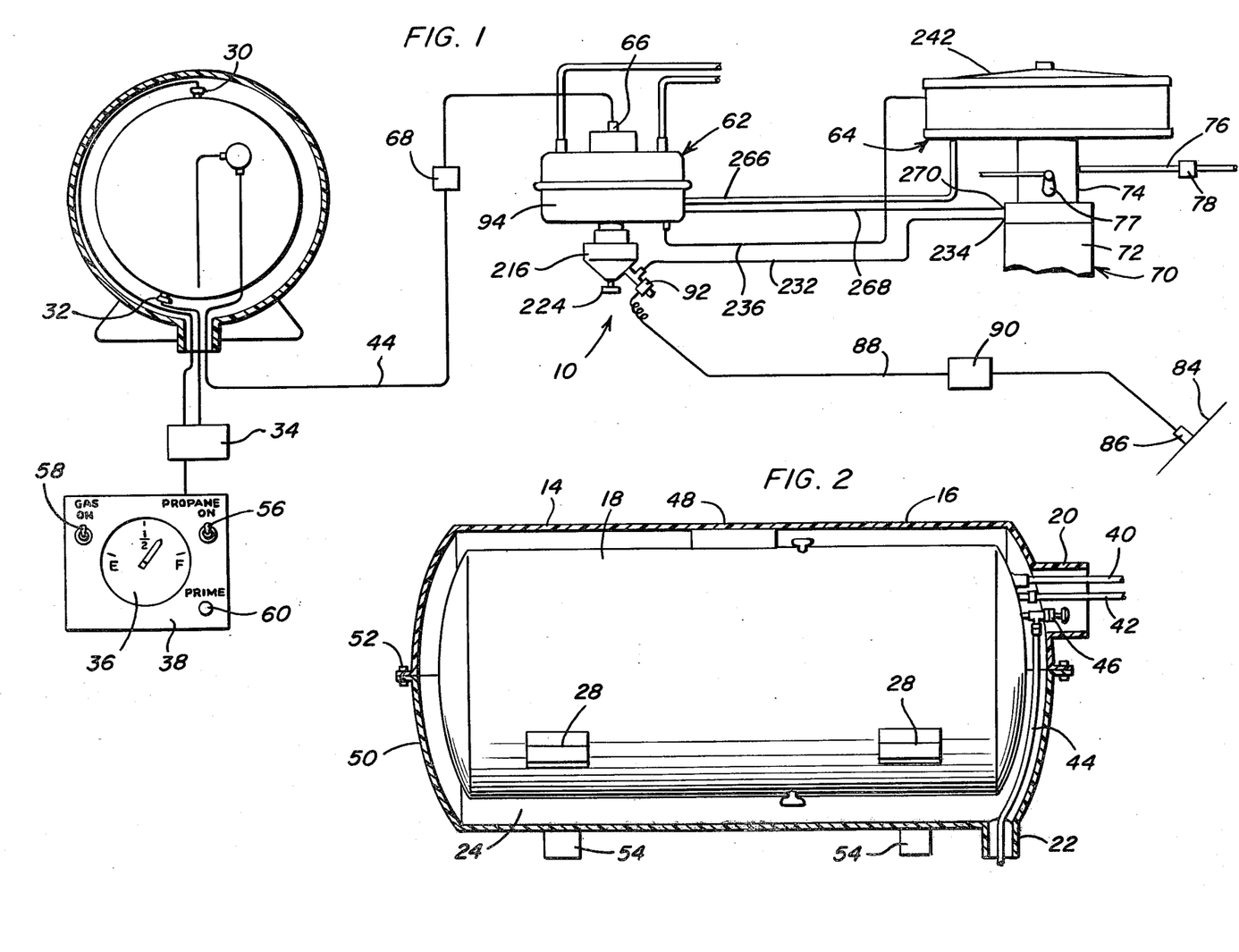
FIG. 1 is a schematic view of the propane carburetion system illustrating its operative association with the air and fuel induction passages and the exhaust system of an attendant combustion engine.
FIG. 2 is an enlarged vertical sectional view of the LPG storage tank.
Figure 3:
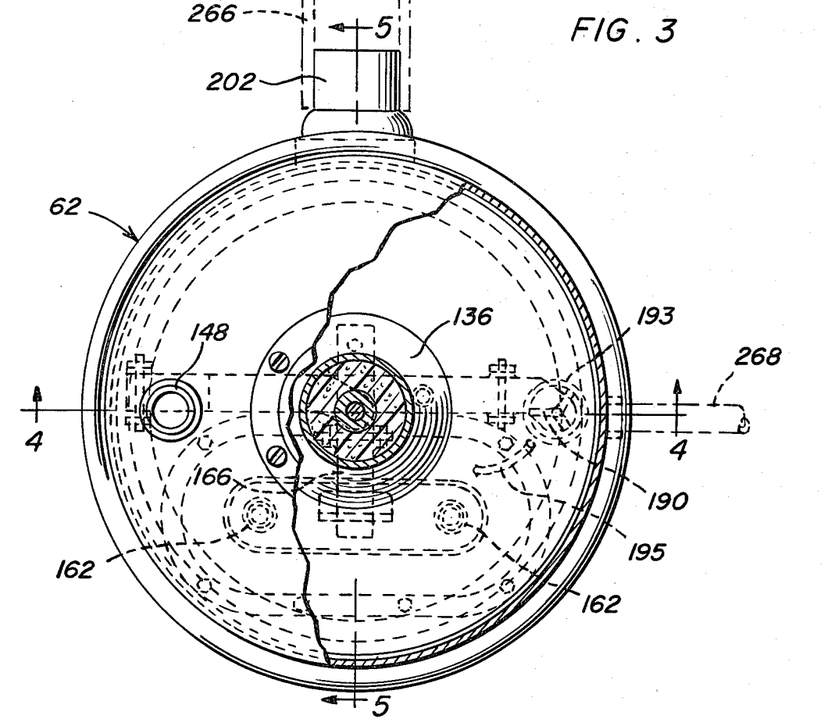
FIG. 3 is an enlarged top plan view of the regulator-vaporizer unit of the system with parts thereof being broken away and illustrated in horizontal section.

Referring now more specifically to the drawings, the numeral 10 generally designates the propane carburetion system of the instant invention. The system 10 includes a storage tank 14 for LPG including an outer shell 16 which surrounds and mounts an inner shell 18 containing the liquid propane fuel. The outer shell 16 contains vent openings 20 and 22 which vent the space 24 between the shells 16 and 18 to the atmosphere when the tank 14 is to be contained within a vehicle. A plurality of mounts 28 are provided and space the inner shell 18 within the outer shell 16. Pressure sensors 30 and 32 are mounted on the upper and lower portions of the inner shell 18 and measure the pressure within the shell 18. The sensors communicate with electronic circuit 34 which detects the difference between the pressures measured by the sensors to give an indication of the fuel level which is displayed on gauge 36 of panel 38. Naturally, when the fuel level in the shell 18 becomes low, the tank should be filled through filler tube 40 which extends from the tank 14 to a convenient location (not shown). An overflow and vent 42 is also connected to the inner shell 18 and is disposed in a convenient location of the associated vehicle. The inner shell 18 includes a fuel line 44 extending therefrom having a valve 46 serially connected therein. The valve 46 may be a commercially available safety valve which shuts off fuel flow through the line 44 in the event that the line 44 is ruptured downstream from the valve 46.

The outer shell 16 is formed in two portions 48 and 50 removably joined together as at 52 and the outer shell 16 may include mounting supports 54 for supporting the tank 14 from a suitable support surface. The panel 38 includes an on/off switch 56 to be referred to hereinafter, a second switch 58 and third push-button-type switch 60 which will also be hereinafter more fully set forth.

The system 10 further includes a combined regulator and evaporator assembly referred to in general by the reference numeral 62 and a mixer assembly referred to in general by the reference numeral 64. The evaporator assembly 62 includes a LPG inlet 66 to which the fuel line 44 extends and the latter includes a solenoid actuated valve 68 serially connected therein under the control of the switch 56.

The system 10 is operatively associated with an internal combustion engine referred to in general by the reference numeral 70 and including an intake manifold 72 upon which a conventional gasoline carburetor 74 is mounted. Gasoline fuel is supplied to the carburetor 74 through a gasoline line 76 and the gasoline line 76 includes a solenoid actuated valve 78 under the control of the switch 58. Further, the carburetor 74 includes a conventional oscillatory throttle valve assembly 77 and an air inlet horn 79 upon which a depending neck portion 80 of the base plate 82 of the mixer assembly 66 is mounted to thereby communicate the interior of the mixer assembly 64 with the interior of the air horn 79.

The engine 70 includes an exhaust manifold portion with which an electronic exhaust gas analyzer is operatively associated and the analyzer 86 is electrically connected in a circuit 88 having a pulse-type switch 90 serially connected therein, the circuit 88 extending to a solenoid 92 actuates a timing mechanism to be hereinafter more fully set forth.

Referring now more specifically to FIGS. 3, 4, 5 and 6 of the drawings, it may be seen that the regulator and evaporator assembly 62 includes a housing 94 from which the inlet 66 is supported. The housing 62 includes upper, intermediate and lower transverse partitions 96, 98 and 100 mounted therein and the inlet 66 includes a tubular fitting 102 in which a vertically reciprocal valve 104 is mounted. From FIGS. 4, 5 and 6 of the drawings, it may be seen that the valve 104 is downwardly biased toward a closed position by a compression spring 106 and that the valve 104 comprises the armature of a solenoid mounted 108 on the top wall 110 of the housing 94, the fitting 102 opening downwardly through the top wall 110. The valve 104 includes a central passage 112 extending therethrough terminating downwardly in a diametric bore 114. The lower terminal end of the valve 104 includes an axial projection 116 upon which an O-ring 118 is mounted and the O-ring 118 is abuttingly engageable against an upwardly facing shoulder 120 defined in the lower end of the fitting 102 through which a central axial passage 102 opens. The lower end of the axial passage 22 opens into a horizontal diametric bore 124 at the upper side thereof and the portion of the passage 22 below the diametric bore 124 defines a downwardly opening counterbore 126 of greater diameter in which a vertically reciprocal valve member 128 is received. The upper end of the valve member 128 includes a projection 130 corresponding to the projection 116 and upon which an O-ring 132 is mounted. The valve 104 closes the upper end of the axial passage 122 from above and the valve member 128 closes the lower end of the axial passage 122 from below. The projection 116 is carried by a lower diametrically reduced end of the valve 104 in which the diametric bore 114 is formed and, accordingly, LPG may enter the inlet 66 and move downwardly through the central passage 112 in the valve 104, outwardly through the opposite end of the diametric bore 114 and downwardly into the axial passage 122 when the valve member 104 has been upwardly displaced through actuation of the solenoid 108 under the control of the switch 56. If the valve member 128 is downwardly displaced from the position thereof illustrated in FIG. 6, the LPG may exit from the lower end of the axial passage 122 and move through the opposite ends of the diametric bore 124 for discharging into the compartment 134 defined beneath the upwardly displaced central portion 136 of the partition 96. The compartment 134 is filled with a foam material 138 for trapping LPG.

Figure 6:
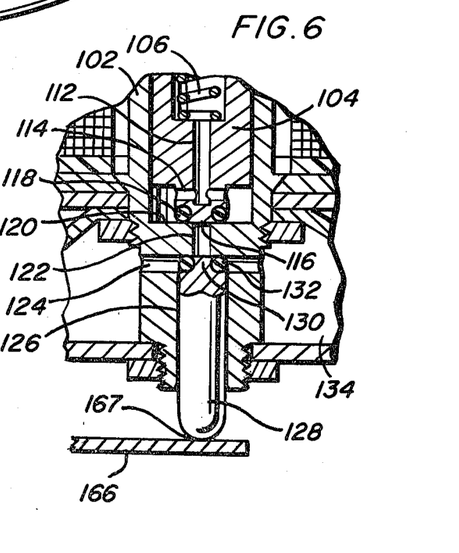
FIG. 6 is an enlarged fragmentary vertical sectional view of the LPG inlet for the regulator-vaporizer.
Figure 7:
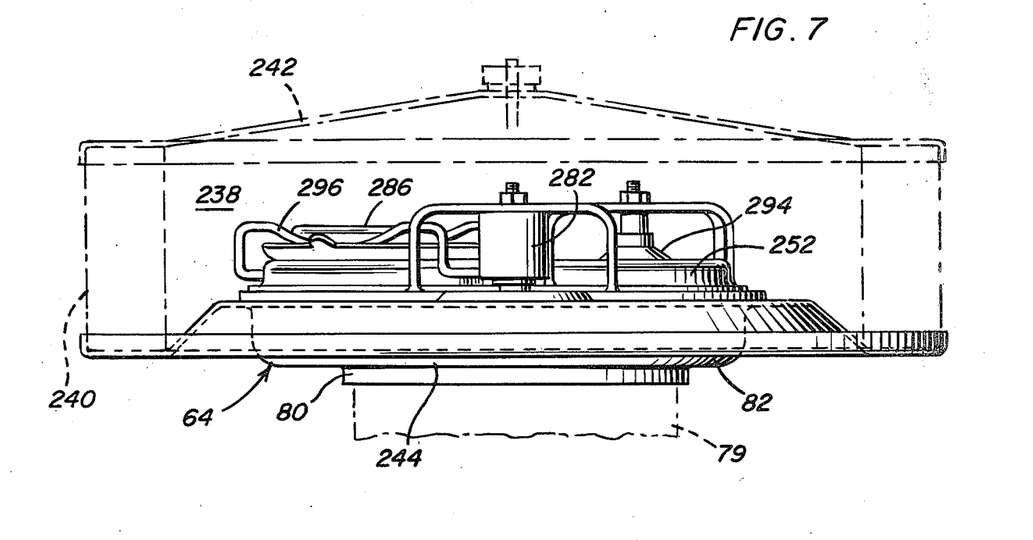
FIG. 7 is a side elevational view of a first form of LPG and air mixer of the instant invention.
Figure 8:
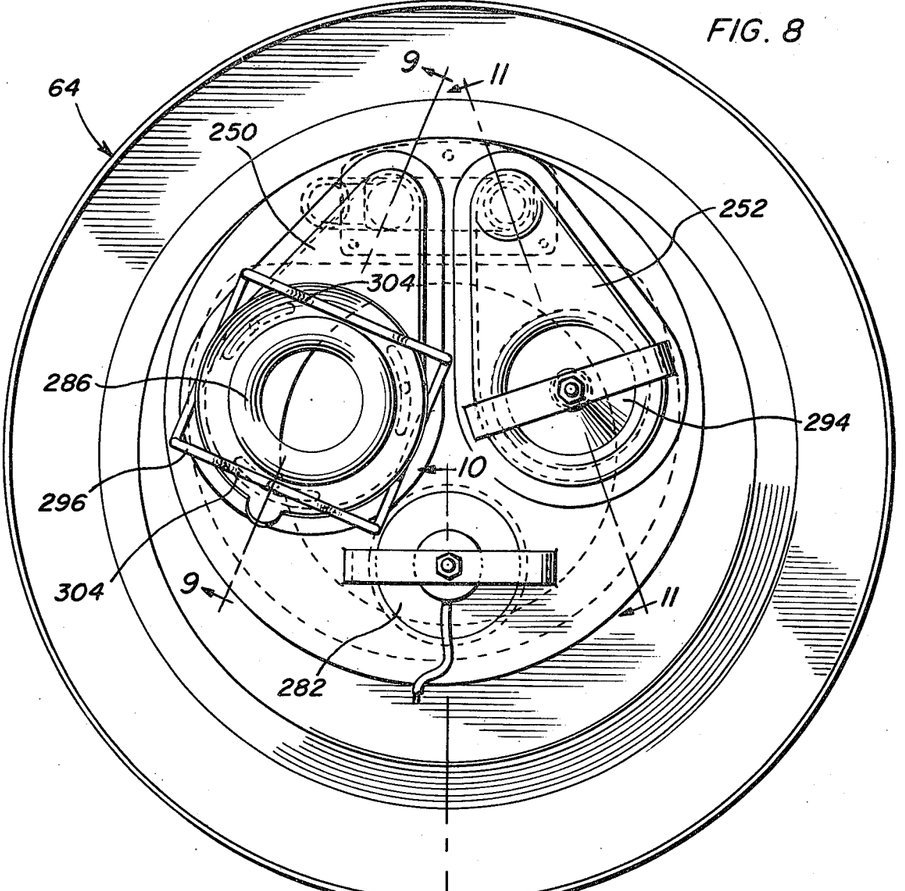
FIG. 8 is a top plan view of the assemblage illustrated in FIG. 7.

The lower end of the fitting 102 has a radially grooved plate 140 mounted immediately therebeneath through the utilization of a threaded nut 142 and by the reduction of pressure of LPG in the compartment 134 a major portion of the LPG is transformed into propane gas and passed outwardly through the grooves in the plate 140 and into the chamber 144 disposed between the partitions 96 and 98. Any residue of LPG within the compartment 134 is retained in the foam material 138 until the LPG has been vaporized.

Figure 4:
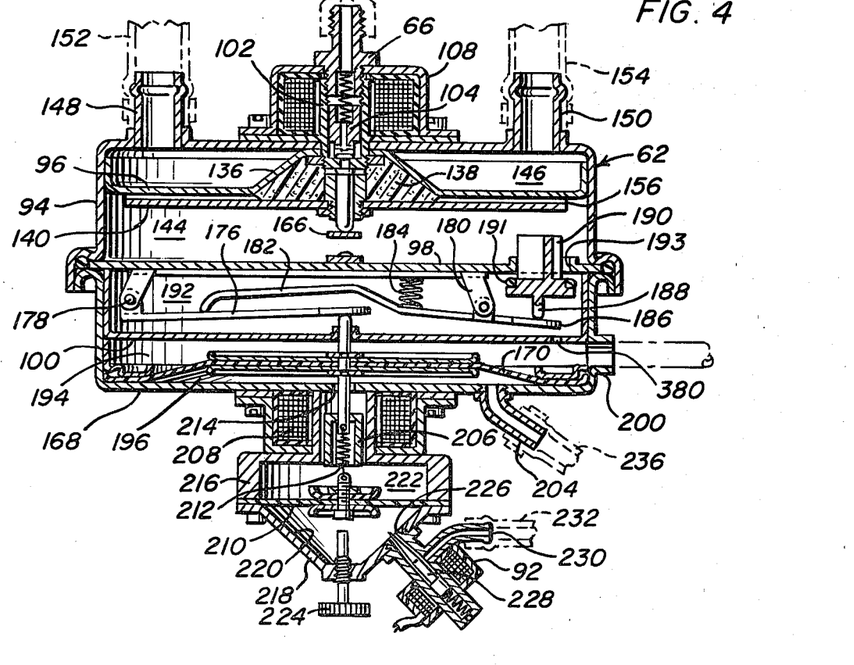
FIG. 4 is a vertical sectional view taken substantially upon the plane indicated by the section line 4—4 of FIG. 3.
Figure 5:
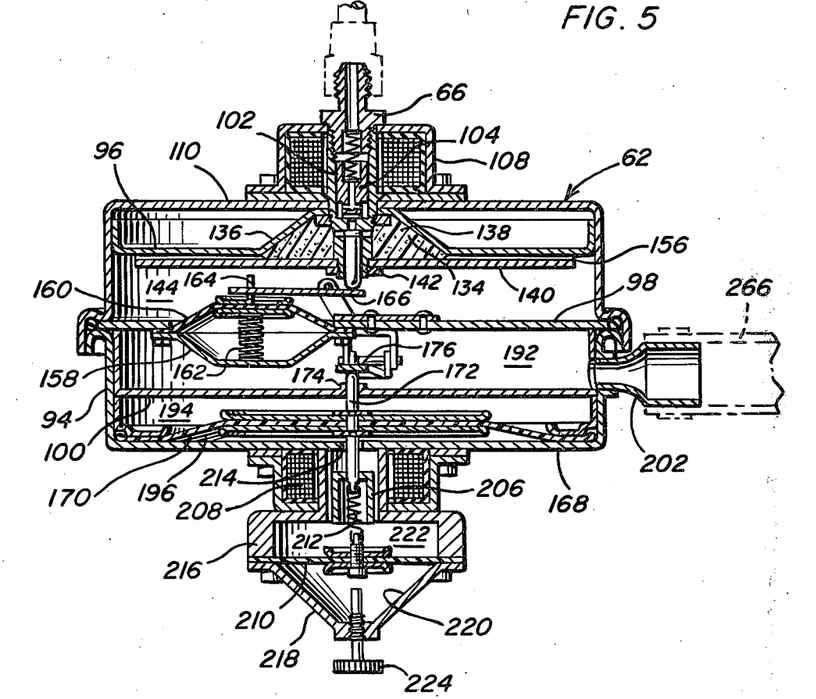
FIG. 5 is a vertical sectional view taken substantially upon the plane indicated by the section line 5—5 of FIG. 3.

With attention now invited more specifically to FIG. 4 of the drawings, it may be seen that the compartment 146 within the housing 94 above the partition 96 includes tubular inlet and outlet fittings 148 and 150 communicated therewith. Hot engine coolant from the engine 70 may be supplied to the inlet fitting 148 through a suitable pipe or hose 152 and may be conveyed back to the engine 70 through a pipe or hose 154 from the fitting 150. In this manner, heated coolant from the engine 70 will be passed through the compartment 146 and adequately heat the partition 96, which partition 96 and the grooved plate 140 define radial passages 156 through which LPG must pass during its movement from the compartment 134 to the compartment 144.

The partition 158 includes an offset oblong depressed portion 158 from whose marginal portions a flexible diaphragm 160 is supported and a pair of compression springs 162 are disposed between the opposite ends of the bottom of the depressed portion 158 and corresponding opposite end portions of the diaphragm 160. The diaphragm 160 includes an upwardly projecting anchor blade 164 through which one end of a pivoted lever 166 is slidably received. The other end of the lever 166 engages the lower end of the valve member 128 as at 167.

The outer marginal portions of the bottom 168 have the outer marginal portions of a large circular diaphragm 170 anchored relative thereto and the diaphragm 170 includes a vertical pin 172 secured therethrough. The upper end portion of the pin 172 is slidably received through a central opening 174 in the partition 100 and the upper terminal end of the pin 172 abuts the free end of a lever 176 pivotally anchored at its other end from a depending mount supported from the partition 98 as at 178. The partition 98 further includes a second depending mount 180 from which one end portion of a second lever 182 is pivotally supported and the free end portion of the lever 182 bears downwardly on the longitudinal midportions of the lever 176, a compression spring 184 being interposed between the longitudinal midportion of the lever 182 and the underside of the partition 98. The compression spring 184 causes the lever 182 to exert a downward pressure on the longitudinal midportion of the lever 176 and the free end of the lever 176 thus applies a downward force on the upper terminal end of the pin 172. The pivoted end of the lever 182 includes a terminal end extension 186 against which a depending pin portion 188 of a vertically slidable valve 190 rests and the valve 190 includes a head portion thereof equipped with an O-ring 191 which sealingly engages the undersurface portions of the partitions 98 disposed about an opening or gas flow port 193 formed in the partition 98 when the valve 190 is upwardly displaced to its closed position.

The partitions 98 and 100 define a chamber 192 therebetween and the partition 100 and bottom 168 of the housing 94 define a chamber 194 therebetween. In addition, yet another chamber 196 is disposed between the diaphragm 170 and the bottom 168. Further, a small diameter tube 195 communicates the chamber containing springs 162 with the interior of chamber 192 closely adjacent port 193.

An idle gas outlet fitting 200 opens outwardly of the chamber 194 and a primary gas outlet fitting 202 opens outwardly of the chamber 192. Further, a fitting 204 opens into the chamber 196 and the lower end of the pin 172 is anchored to an armature 206 of a solenoid 208 mounted on the bottom 168 of the housing 94 and the pin 172 is further anchored to the central portion of a diaphragm 210 by an expansion spring 212. The pin 172 is loosely received through a central opening 214 formed in the bottom 168 and the diaphragm 210 is secured across a downwardly opening housing 216 carried by the bottom 168 and about an upper portion of which the solenoid 208 is mounted. The downwardly opening lower end of the housing 216 is closed by the diaphragm 210 and an upwardly opening cover 218 is secured over the underside of the diaphragm 210 and defines a chamber 220 below the diaphragm, a chamber 222 being defined within the housing 216 above the diaphragm 210. The chamber 222 is communicated with the chamber 194.

The central portion of the cover threadingly supports a limit screw 224 for adjustably limiting downward movement of the diaphragm 210 and the cover 218 includes a vacuum port 226 under the control of a spring biased valve 228. The valve 228 is spring biased to the closed position and comprises an armature for the solenoid 92. The port 226 has a vacuum fitting 230 operatively associated therewith and a vacuum line 232 extends from the fitting 230 to a vacuum port 234 in the base of the carburetor 74.

A pressure balance line 236 extends from the fitting 204 to the interior of the chamber 238 disposed immediately above the base plate 92 and inwardly of the annular air filter element 240 supported from the outer annular marginal portion of the base plate 82 and having an air cleaner top 242 secured thereover. The line 236 comprises a pressure balance line communicating the interior of the chamber 196 with the interior of the chamber 238 and compensates for increased vacuum within the chamber 238 as the result of gradual partial clogging of the air filter 240.

With attention now invited more specifically to FIGS. 7 through 12, it may be seen that the base plate 82 includes a centrally depressed portion 244 from which the neck portion portion 80 is supported and that a plate 246 is secured over the centrally depressed portion defining a hollow chamber 248 between the centrally depressed portion 244 and the plate 246. In addition, a pair of downwardly opening covers 250 and 252 are secured over the plate 246 and define chambers 254 and 256 beneath the covers 250 and 252 and above the plate 246, a gas inlet fitting 258 being supported from the underside of one marginal portion of the base plate 82 and opening upwardly into the chambers 254 and 256 through ports 260 and 262, the port 262 having a gravity ball check element 264 operatively associated therewith. Of course, the main gas fitting 202 is communicated with the fitting 258 by a main gas line 266 extending therebetween. Also, an idle gas line 268 extends between the idle gas outlet fitting 200 and an idle port 270 in the base of the carburetor 74.

Figure 9:
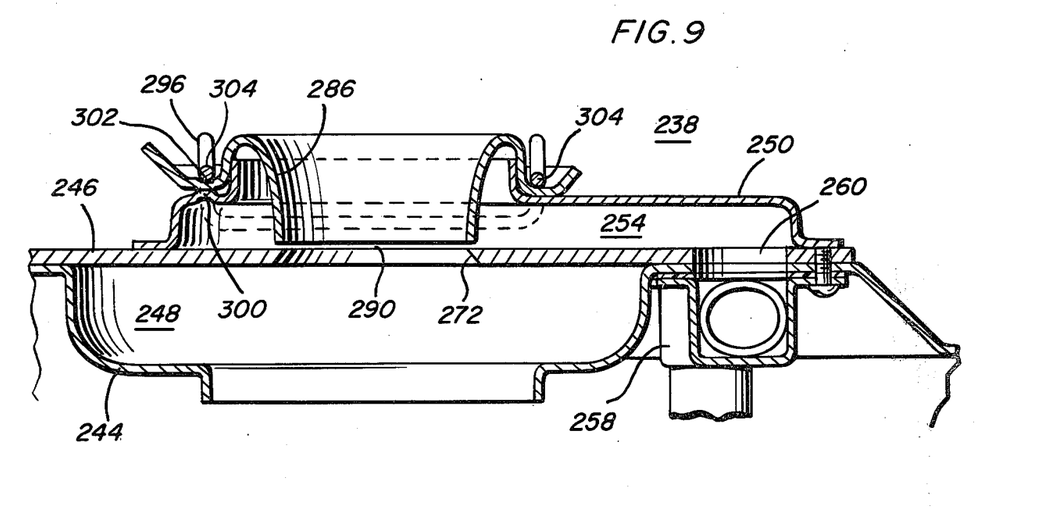
FIG. 9 is an enlarged fragmentary vertical sectional view taken substantially upon the plane indicated by the section line 9—9 of FIG. 8.
Figure 10:
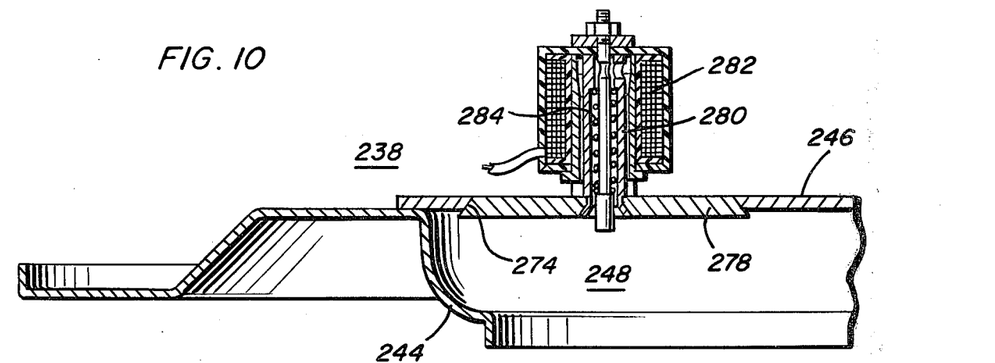
FIG. 10 is an enlarged fragmentary vertical sectional view taken substantially upon the plane indicated by the section line 10—10 of FIG. 8.

The plate 246 includes three openings 272, 274 and 276 formed therethrough opening into the chamber 248 from the chamber 238 and the openings 272, 274 and 276 flare downwardly. The opening 274 has a valve member 278 operatively associated therewith and valve member 278 is supported from an armature sleeve 280 of a solenoid 282 under the control of the switch 58. Further, the armature sleeve 280 is yieldingly upwardly biased by a compression spring 284 whereby the valve member 278 is yieldingly biased to the closed position. However, upon the presence of sufficient reduction of pressure within the chamber 248, the valve member 278 will open against the biasing action of the spring 74, unless the solenoid 282 is actuated by the switch 58.

Figure 11:
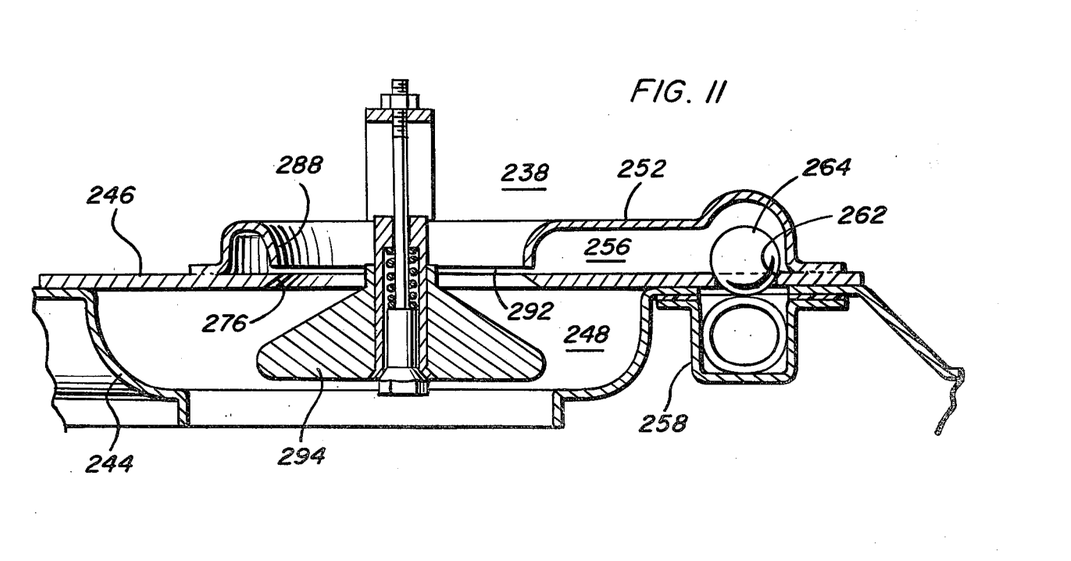
FIG. 11 is an enlarged fragmentary vertical sectional view taken substantially upon the plane indicated by the section line 11—11 of FIG. 8.
Figure 12:
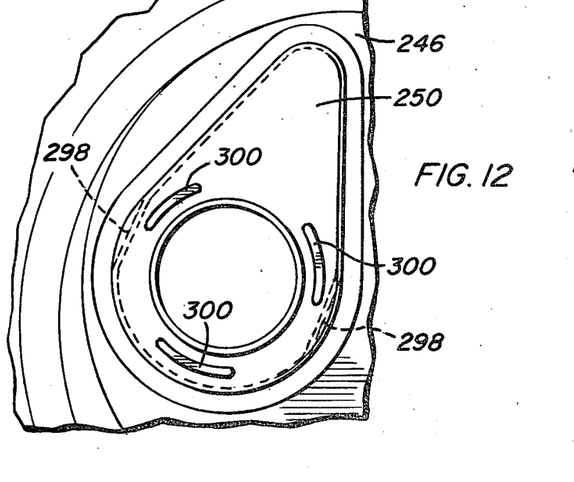
FIG. 12 is a fragmentary top plan view of that portion of the structure of FIG. 8 through which the section line 9—9 extends and with the air horn portion of that structure removed.
Figure 13:
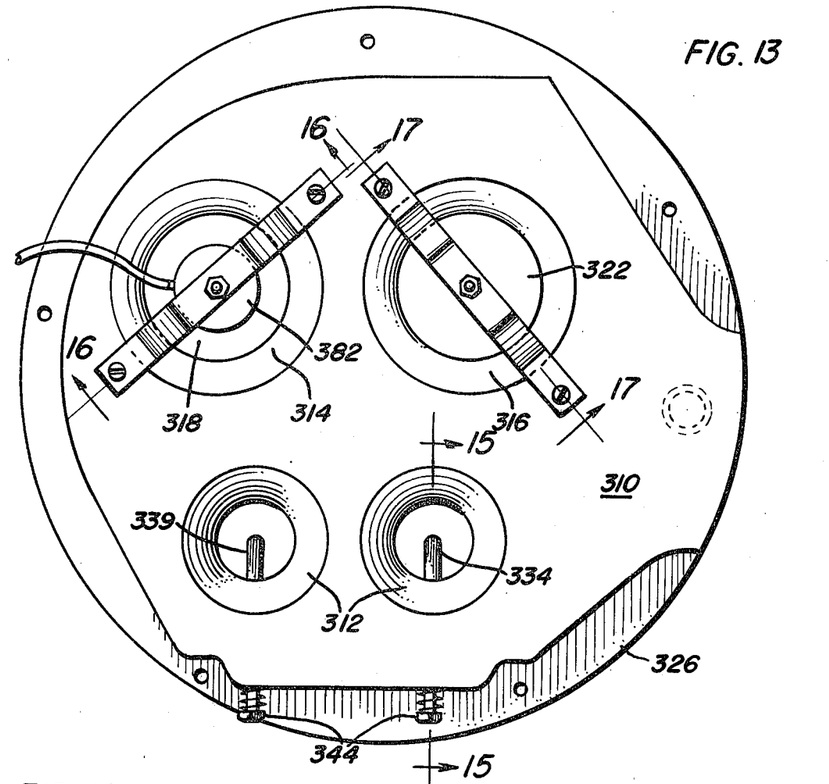
FIG. 13 is a top plan view of a second form of induction air and LPG mixer of the instant invention.
Figure 14:
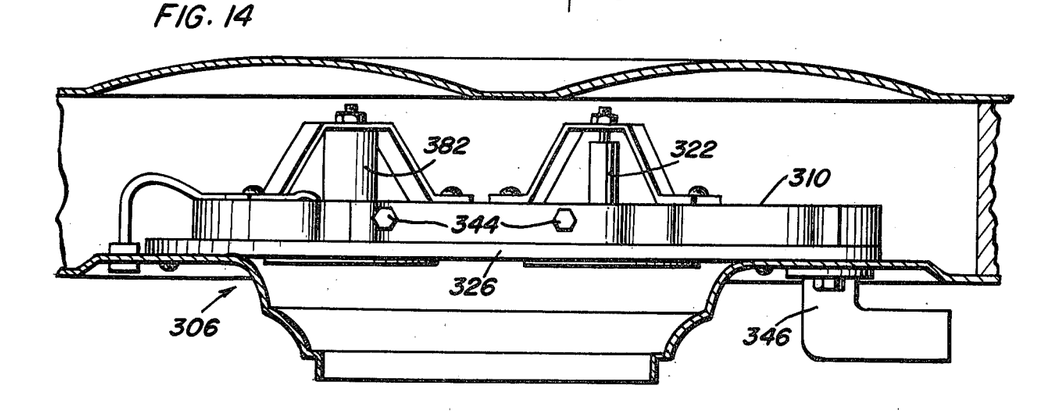
FIG. 14 is a side elevational view of the assemblage illustrated in FIG. 13.

The covers 250 and 252 define air horns 286 and 288 opening upwardly into the chamber 238 and the lower ends of the air horns 286 and 288 terminate downwardly a spaced distance above the upper surface of the plate 246 in registry with the openings 272 and 276. Thus, gas inlet slots 290 and 292 are defined between the lower ends of the air horns 286 and 288 and the plate 246, the slots communicating with the chambers 254 and 256. A spring biased valve member 294 of conical shape is supported for shifting between open and closed positions relative to the opening 276 and the valve member 294 is spring biased toward an upper closed position and downwardly displaceable toward an open position responsive to sufficient lower pressure within the chamber 248 than that pressure which is present in the chamber 238. The air horn 288 comprises an integral portion of the cover 254, but the air horn 286 seats against and is rotatable relative to the cover 250 and is frictionally retained in adjusted rotated position through the utilization of a spring 296 having opposite side portions thereof snap-received in opposite side notches 298 formed in the cover 250. In addition, the cover 250 includes three circumferentially spaced arcuate inclined ramp portions 300 and the air horn 286 includes three circumferentially spaced projections 302 engaged with the ramp portions 300. The spring 296 includes additional opposite side portions 304 which retain the projections 302 in tight seated engagement with the ramp portions 300. Accordingly, the air horn 286 may be slightly rotated in order to vary the width of the slot 290 as required.

With attention now invited more specifically to FIGS. 13 through 17 of the drawings, there may be seen a modified form of mixture assembly referred to in general by the reference numeral 306. The mixer assembly 306 is similar to the mixer assembly 64. The mixer assembly 306 includes a plate 308 corresponding to the plate 246 and a cover plate 310 serving substantially the same purpose as that served by the cover plate 250 and 252. The cover plate 310 defines a pair of small diameter air horns 312, a first larger air horn 314 and a second larger air horn 316. A solenoid actuated valve member 318 corresponding to the solenoid actuated valve member 278 is operatively associated with the air horn 314 and the associated opening 320 in the plate 308 corresponding to the opening 272 and a spring biased valve member 322 is operatively associated with the air horn 316 and the opening 324 in the plate 308 corresponding to the opening 276.

Figure 15:
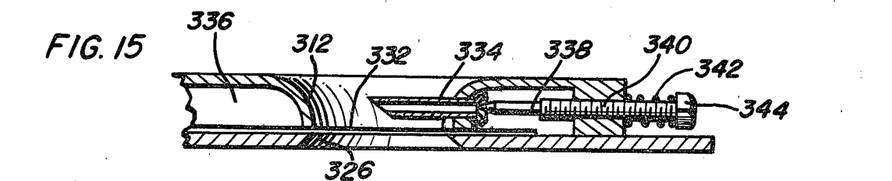
FIG. 15 is an enlarged fragmentary vertical sectional view taken substantially upon the plane indicated by the section line 15—15 of FIG. 13.
Figure 16:
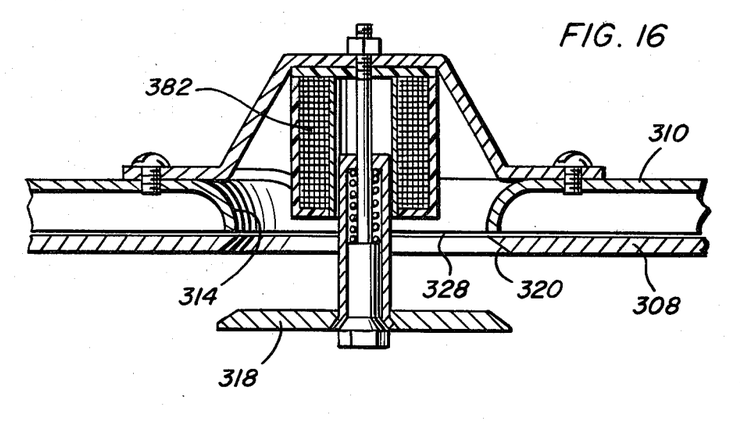
FIG. 16 is an enlarged fragmentary vertical sectional view taken substantially upon the plane indicated by the section line 16—16 of FIG. 13.
Figure 17:
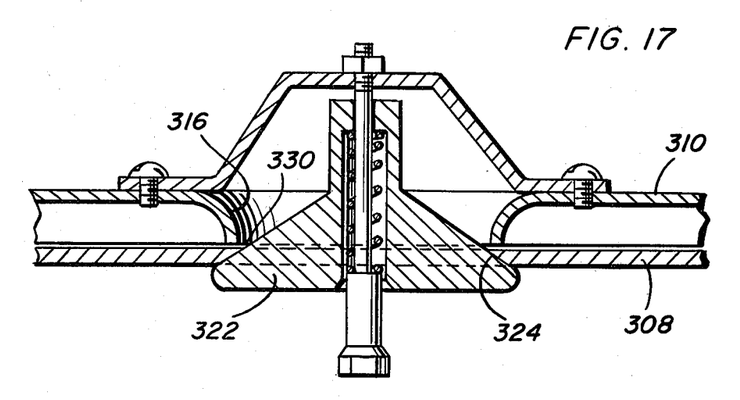
FIG. 17 is an enlarged fragmentary vertical sectional view taken substantially upon the plane indicated by the section line 17—17 of FIG. 13.

Rather than providing a single opening corresponding to the opening 272 in the plate 46, the plate 308 includes a pair of openings 326 formed therein with which the air horns 312 are operatively associated and it will be noted that the cover 310 defines a gas slot 328 opening into the opening 320, a gas slot 330 opening into the opening 324 and a pair of gas slots 332 opening into the openings 326. Of course, the valve members 318 and 322 are actuated in the same manner as the valve members 278 and 294. However, the air horns 312 have a pair of radial gas discharge pipes 334 opening thereinto from the chamber 336 corresponding to the chambers 254 and 256 and the radial outermost ends of the pipes 334 disposed within the chamber 336 include tapered metering jets 338 operatively associated therewith and threadingly supported from the cover 310 as at 340. Of course, the outer ends of the metering jets 338 are provided with conventional compression springs 342 and non-circular heads 344 for adjustment of the metering jets 338 from the exterior of the cover 310. Further, gas is supplied to the chamber 336 through a fitting 346 corresponding to the fitting 258.

Figure 18:
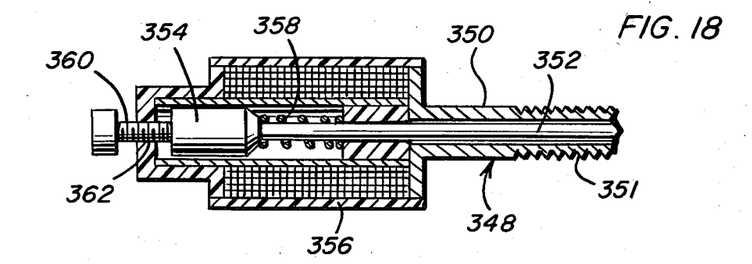
FIG. 18 comprises an enlarged fragmentary vertical sectional view of a solenoid actuated and automatic fuel mixture leaning adjustment valve to be utilized as a replacement for the threaded adjustment fuel valve illustrated in FIG. 15.
Figure 19:
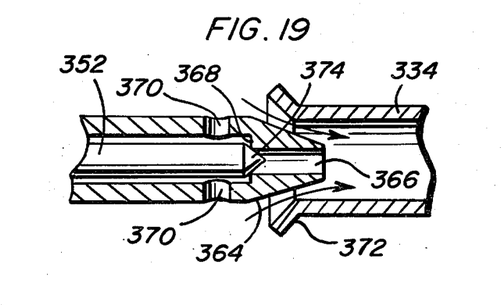
FIGS. 19 and 20 are enlarged fragmentary vertical sectional views illustrating the normal and lean fuel mixture operating modes of the solenoid actuated fuel metering valve of FIG. 18.
Figure 20:
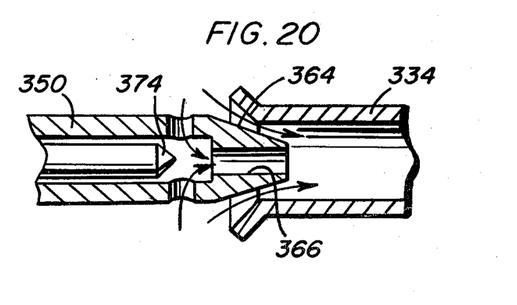

With attention now invited more specifically to FIGS. 18, 19 and 20 of the drawings, there may be seen a modified form of metering jet referred to in general by the reference numeral 348. The metering jet 348 may be utilized in lieu of the metering jet 344. The jet 348 includes an outer tubular body 350 which is externally threaded as at 351 whereby the jet 348 may be threadingly supported from the cover 310 as at 340. However, the jet 348 includes a metering rod 352 reciprocal in the tubular body 350 and including an armature 354 mounted thereon. The armature 354 comprises a part of a solenoid 356 carried by the tubular body 350 and the jet 348 includes a compression spring 358 which yieldingly biases the rod 352 and armature 354 toward the left as viewed in FIG. 18 with the armature 354 abutted against a limit screw 360 threadingly supported from the housing of the solenoid 356 as at 362. The end of the tubular body 350 remote from the solenoid 356 includes a hollow tapered tip 364 having a diametrically reduced passage 366 formed therethrough and defining a shoulder as at 368. Further, the tubular body 350 includes diametrically opposite radial ports 370 which open into the interior of the tubular body 350 upstream from the diametrically reduced passage 336. The tapered tip 364 of the jet 348 is adapted to be threadedly advanced toward and away from the flared inlet end 372 of the corresponding pipe 334 when the jet 348 is to be utilized in lieu of the jet 338. The tapered tip 364 is adjusted for normal operation of the associated engine 70 and actuation of the solenoid 356 is designed to occur either manually or automatically through the utilization of a high vacuum actuated switch at a result of light load condition operation of the engine 70. When the solenoid 356 is actuated, the armature 354 is shifted to the right as view in FIG. 18 of the drawings and the tapered tip 374 of the metering rod 352 seats against the inlet end of the diametrically reduced passage 366 closing the latter.

Of course, when the metering rod 352 is spring retracted to the left as viewed in FIG. 18 of the drawings, the tapered tip 374 thereof is displaced upstream from the inlet end of the diametrically reduced passage 366 as shown in FIG. 20 of the drawings and gas may enter the pipe 334 through the passage 366 as well as about the tapered tip 364 of the tubular body 350. Thus, under normal operation, the pipe 334 receives gas not only about the tip 364 but also through the diametrically reduced passage 366 formed in the center of the tip 364. As soon as a light load condition of operation of the engine 70 is realized, the solenoid 356 may be actuated in order to shift the rod 352 to the right as viewed in FIG. 19 of the drawings, whereby the tapered tip 374 of the rod 352 will close the inlet end of the diametrically reduced passage 366.

Considering first the operation of that form of the invention illustrated in FIGS. 1 through 12, liquid propane enters the regulator vaporizer assembly 62 under the control of the valve 104, when the solenoid 108 is actuated, and the valve member 128. The liquid propane is initially partially transformed into a gas as a result of the reduction of pressure thereof when the liquid propane passes through the bores 114, the axial passage 122 and the bores 124 into the compartment 134. The liquid propane is further transformed into a gas as it passes through the foam member 138 and the passages 156 into the compartment 144, the propane being heated as it passes in intimate contact with the undersurface of the partition 96. The partition 96 being heated by hot engine coolant passing through the compartment 146.

The propane, in a gaseous form, then passes through the opening 194, past the valve 190 and into the chamber 192 when the valve 190 is opened. A major portion of the propane may then pass from the chamber 192 through the fitting 202 and into the line 266 whereupon it is ducted to the fitting 258 and into the chambers 254 and 256. A minor portion of the propane passes through a small diameter port 380 in the partition 100 and into the chamber 194 from which the minor portion of propane may pass through the fitting 200 and into the line 268 by which it is conveyed to the idle port 270 in the base of the caburetor 74. The solenoid 92 is under the control of the switch 90 and when the analyzer 86 senses that the propane and air mixture being burned in the engine 70 is too rich, the solenoid 92 is rapidly actuated and deactuated whereby engine vacuum at the port 234 is communicated through the line 232 and into the chamber 220 to thereby slightly downwardly deflect the diaphragm 210 so as to pull downwardly on the pin 172 through the expansion spring 212 and thus cause angular displacement of the levers 176 and 182 for slightly closing the valve 190 and reducing the supply of propane gas to the chambers 254 and 256.

Under normal operation, only the air horn 286 is in operation. When the throttle valve 76 of the caburetor 74 is opened, the pressure within the chamber 248 is reduced and the valve member 94 is moved by the greater pressure in the chamber 238 toward the open position thereof illustrated in FIG. 11 of the drawings whereby additional air from the chamber 238 may be allowed to flow into the chamber 248 and to be enriched by propane from the slot 292, the air which passes through the air horn 286 and the opening 272 being enriched by propane from the slot 280. Of course, the height of the air horn 286 may be adjusted by rotating the air horn 286 relative to the cover 250.

The solenoid 208 is under the control of the time switch 60 and actuation of the solenoid 208 causes the armature 206 and the pin 172 to be upwardly displaced whereby the levers 176 and 182 are angularly displaced to positions allowing the valve 190 to move toward a full open position. In this manner, the chamber 254 may receive an additional supply of propane for priming the engine 70 preparatory to starting the same.

If it is desired to operate the engine on gasoline as opposed to propane, the switch 56 is actuated to deactivate the solenoid 108 whereby the valve 104 will be closed. At the same time, the switch 58 is actuated to open the valve 78 and to deactivate the solenoid 282 whereby the valve member 278 may be opened and air may pass freely from the chamber 238 through the opening 274 and past the valve 278 into the chamber 248 for subsequent movement through the carburetor 74 and enrichment by gasoline fuel in the conventional manner.

The operation of that form of the invention illustrated in FIGS. 13 through 17 is substantially identical to the operation of the first form of the invention illustrated in FIGS. 1 through 12, except that the two air horns 312 are utilized during normal light load operating conditions of the engine 70 in lieu of the single air horn 286 of FIG. 9. In addition, in lieu of the adjustment of the air horn 286 to vary the amount of propane supplied to the engine 74 during normal operation thereof, the metering jets 238 are adjusted as desired. However, if the jets 348 are used in lieu of the jets 338, the jets 348 are initially adjusted by adjusting the limit screws 360 and also the adjustment of the threaded body 350 and a suitable control for the solenoids 356 (either manual or automatic) may be utilized to vary the normal propane-air mixture under light operating loads of the engine 70. If the engine 70 utilizing that form of the invention illustrated in FIGS. 13 through 20 is operated under heavy loads, the valve or valve member 322 is automatically opened as a result of the greater air pressure thereabove and an additional supply of air enriched by propane from the slot 330 is ducted to the engine 70 through the carburetor 74. Of course, if that form of the invention illustrated in FIGS. 13 through 17 is to be operated through the use of gasoline as its fuel, the solenoid 382 is deactivated through actuation of the switch 56 and the valve member 318 may thus drop downward toward the open position thereof illustrated in FIG. 16.

If it is desired to operate the engine 70 independent of the use of gasoline, the opening or port 274 and the associated solenoid actuated valve member 278 may be eliminated from that form of the invention illustrated in FIGS. 1 thru 12. In addition, the air horn 314, the opening 320 and the solenoid actuated valve member 318 may be eliminated from that form of the invention illustrated in FIGS. 16 through 20. Also, if the engine 70 is to be operated independent of gasoline, the carburetor 74 may be removed and replaced by the mounting assembly 306 as long as ports corresponding to the vacuum and idle ports 234 and 270 are provided. In addition, it has been found that the addition of propane to the induction of a diesel in the amount of up to 30% propane BTU value of the total diesel fuel BTU value being supplied to the engine can materially increase the power output of the diesel engine an amount appreciably greater than the percentage of propane BTU value being added.

The gravity ball check element 264 in FIG. 11 is provided to assure that air is not drawn backwards from chamber 256 into the chamber 254 when the valve member is closed. When the valve member is closed, there is no reduction of pressure within the chamber 256 and the gravity ball check element 264 seats against the port 262 to close the latter. However, when the valve member 294 is opened as a result of greater demand of air for the engine 70, the gravity ball check element 264 is unseated from the port 262 and propane may flow from the fitting 258 into the chamber 256 and through the slot 292 for fuel enriching the air passing through the air horn 288 and the opening 276.

With reference again to FIGS. 3, 4 and 5 of the drawings, as gas exits from the chamber 192 through the fitting 202 to the mixer assembly 64, a slight reduction in pressure is realized in the chamber 192 and hence in the chamber 194 via the small diameter port 380 and the diaphragm 170 is thus slightly upwardly displaced in turn resulting in slightly greater opening of the valve 190 to allow a greater amount of fuel to pass from the chamber 144 into the chamber 192 for subsequent discharge from the chamber 192 through the fitting 202. As the valve 190 is further opened, the end of the tube 195 remote from the underside of the diaphragm 160 experiences a slight surge of pressure and this surge of pressure is transmitted back through the tube 195 to the diaphragm chamber beneath the diaphragm 160 and thus supplements the upward thrust of the springs 162 on the center of the diaphragm 160 and thereby causes the lever 166 to allow the valve member 128 to move more fully toward an open position.

The pressure balance line 236 extending from the fitting 204 to the chamber 238 inwardly of the air filter 240 automatically compensates for the air filter 140 becoming dirty and resisting the flow of induction air therethrough. When the air filter 140 becomes dirty and resists the flow of induction air therethrough, a greater vacuum is realized in the chamber 138 and this greater vacuum is communicated with the chamber 196 below the diaphragm 170 so as to automatically reduce the amount of propane gas which is delivered to the chambers 254 and 256. Therefore, the proper ratio of air and propane gas is maintained even though the air filter 240 gradually becomes dirty.

It is pointed out that with most propane carburetion systems wherein the associated air filter becomes dirty the result is that the propane to air ratio becomes greater and thus the associated engine is less fuel efficient. By utilizing the pressure balance line 236, this gradual excess fuel enrichment of the induction air is avoided.

Also, it is pointed out that the valve 190 opens in the direction of the flow of gas through the opening 173 thereby eliminating the usual delay of opening of corresponding but oppositely opening valves usually associated with comparable pressure regulating and evaporator assemblies. Still further, the LPG enters the regulator and evaporator assembly 62 through the upper central portion thereof and thereafter passes through the outwardly radiating passages 156. In this manner, the propane gas is more controllably heated to the desired temperature and is more evenly distributed to the chamber 144 for ready flow through the opening 93 for subsequent movement to the mixer assembly 64.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. A mixer for first and second gases, said mixer including a substantially longitudinally straight venturi duct portion including opposite axial end large cross sectional area inlet and outlet end portions for intaking and discharging one of said gases passing through said venturi duct portion and a smaller cross sectional area midportion including means defining at least a substantially peripherally continuous slot extending about midportion and spaced intermediate said inlet and outlet end portions, and gas supply means for supplying said second gas to said slot for passage therethrough into the interior of said venturi duct portion downstream from the inlet end portion thereof.

2. The mixer of claim 1 including means operative to adjustably vary the width of said slot measured axially of said venturi duct portion.

3. The mixer of claim 1 wherein said venturi duct portion includes a plate having an opening formed therethrough and a tubular horn stationarily supported relative to said plate on one side thereof and in slight axially spaced relation relative to the end of said opening opening through said one side of said plate and with said horn registered with said opening, the axial spacing of said horn from said one side of said plate defining said slot.

4. The mixer of claim 3 wherein said opening is flared toward the other side of said plate.

5. The mixer of claim 4 including valve means shiftably supported relative to said plate for movement into and out of position closing said opening from said other side of said plate.

6. The mixer of claim 5 including means mounting said horn for adjusted axial shifting relative to said plate to thereby vary the width of said slot measured axially of said horn.

7. An internal combustion engine having an induction system including an intake manifold for channeling intake air to a combustion chamber of said engine, a storage tank for storing liquefied gaseous fuel under pressure, a regulator and vaporizer means for receiving liquefied fuel from said tank, reducing the pressure of received fuel and vaporizing the fuel, air and vaporizer fuel mixer means connected to said intake manifold, said mixer means including a substantially longitudinally straight venturi duct portion including opposite axial end large cross sectional area inlet end portions and a smaller cross sectional area midportion including axially spaced apart portions defining at least a substantially peripherally continuous slot extending about said venturi midportion between the inlet and outlet end portions thereof, gas supply means for supplying vaporized fuel to said slot for passage therethrough into the interior of said venturi duct portion downstream from the inlet end portion thereof, said outlet end portion being communicated with said intake manifold.

8. The combination of claim 7 wherein said mixer means includes a second venturi duct portion including a second slot and said gas supply means includes means for supplying said second gas to said second slot, a valve selectively shiftable into and out of position closing the outlet end of said second venturi duct portion.

9. The combination of claim 8 including means yieldingly biasing said second valve toward the closed position thereof.

10. The combination of claim 9 wherein said mixer includes means defining an air passage including inlet and outlet end portions and said air passage outlet end portion is communicated with said intake manifold, a valve selectively shiftable between first and second positions opening and closing said air passage, said outlet end portions of said venturi duct portions and said outlet end of said air passage being communicated with said intake manifold through a liquid fuel carburetor mounted on said intake manifold.

11. The combination of claim 7 wherein said engine includes an exhaust gas analyzer operatively associated therewith for closing an electrical circuit responsive to said analyzer sensing a fuel rich condition of the exhaust gases of said engine, said electrical circuit including a pulse-type switch for pulsing, at an adjustable rate, an associated control circuit, and a control for said regulator and vaporizer means operative to pulse reduce the discharge of gas from said regulator responsive to pulsing of said control circuit.

12. The combination of claim 11 wherein said engine includes a fluid coolant cooling system, said regulator and vaporizer means including means for passing said engine coolant in intimate transfer relation with the gas passing through said regulator and vaporizer.

13. The combination of claim 11 including means operative to selectively increase the rate of flow of gas from said regulator and vaporizer means.

14. The combination of claim 11 including means responsive to an increase of manifold vacuum for reducing the flow of gas from said regulator and evaporator means.

15. The combination of claim 11 wherein said regulator and vaporizer means includes a control valve therein for admitting LPG thereinto and engine vacuum controlled valve means for controlling the flow of gas from said vaporizer to said mixer means, and means operative responsive to an increase of gas flow through the vacuum controlled valve to increase the flow of LPG through said control valve.

16. In an air and gas mixer of the type including a venturi zone for passing air therethrough to be enriched by a gas, first means for admitting a primary charge of gas into said venturi zone at a first rate intermediate the opposite ends of said venturi zone for admixing with the air passing through said venturi zone, and second means for admitting a secondary charge of gas into said venturi zone at a second slower rate.

17. The mixer of claim 16 wherein said first means includes means for admitting said primary charge into the outer peripheral area of said zone throughout a path extending at least substantially fully thereabout, said second means including means for admitting said secondary charge of gas into said venturi zone substantially along the longitudinal center axis of said venturi zone.

18. The mixer of claim 16 wherein said second means includes means for semi-permanently adjusting said second rate.

19. The mixer of claim 18 wherein said second means includes remotely operable means for selectively step reducing said second rate.

20. The mixer of claim 19 wherein said first means includes means for admitting said primary charge into the outer peripheral area of said zone throughout a path extending at least substantially fully thereabout, said second means including means for admittng said secondary charge of gas into said venturi zone substantially along the longitudinal center axis of said venturi zone.

21. In combination with a combustion engine including air and fuel mixture induction passage means having an inlet end, a supply of liquefied gaseous fuel under pressure, pressure regulating and vaporizing means with which said supply of fuel is communicated and including a gas discharge means, said pressure regulating and vaporizing means including means operative to reduce the pressure of and to vaporize liquefied fuel supplied to said pressure regulating and vaporizer means from said supply of liquefied fuel and to discharge gas from said gas discharge means, an air and gas fuel mixer including an air inlet and a gas fuel enriched air outlet, said gas fuel enriched air outlet being communicated with said induction passage means, said mixer including a reduced cross sectional area venturi zone communicating said air inlet and said gas fuel enriched air outlet, said mixer including gas discharge means supplying a charge of gas at a first rate to said venturi zone throughout an anular area extending substantially fully about the periphery of said venturi zone intermediate the inlet and outlet ends thereof, and means for supplying a secondary charge of gas to said venturi zone at a second slower rate along the longitudinal center axis thereof intermediate the opposite ends of said venturi zone.

22. The combination of claim 21 including means operative to selectively step reduce the rate of supply of gas to the longtitudinal center line of said venturi zone.

* * * * *